United States Patent [19]

Eden

[11] Patent Number: 4,554,991
[45] Date of Patent: Nov. 26, 1985

[54] AUXILIARY HYDRAULIC DRIVE SYSTEM FOR ROAD GRADERS AND THE LIKE

[75] Inventor: Brent E. Eden, Wolcott, Ind.

[73] Assignee: Mud Hog Corporation, Brookston, Ind.

[21] Appl. No.: 582,913

[22] Filed: Feb. 23, 1984

[51] Int. Cl.⁴ .......................... B60K 3/00; F16D 31/02
[52] U.S. Cl. ..................................... 180/243; 60/445; 60/467; 60/468; 60/490; 91/401; 180/307
[58] Field of Search .................. 180/242, 243, 307; 60/445, 467, 468, 487, 488, 490; 91/400, 401

[56] References Cited

U.S. PATENT DOCUMENTS

| | | | |
|---|---|---|---|
| 2,233,521 | 3/1941 | Ernst | 91/401 |
| 2,769,429 | 11/1956 | Lencioni | 60/467 |
| 3,250,073 | 5/1966 | Ellis | 60/467 |
| 3,734,225 | 5/1973 | Kobald | 60/445 |
| 4,197,705 | 4/1980 | Westveer | 60/445 |

*Primary Examiner*—Douglas Hart
*Attorney, Agent, or Firm*—Laubscher & Laubscher

[57] ABSTRACT

An improved hydraulic auxiliary drive system for driving the normally non-driven wheels of a vehicle is disclosed. A variable displacement motor having a tiltable swash plate operable between zero and full displacement positions drives the normally non-driven wheels and a variable displacement pump supplies pressure fluid to the motor. A spring biases the swash plate toward its zero displacement position and a servo mechanism is connected with the swash plate for tilting the same. A first supply delivers pressure fluid to the servo mechanism to tilt the swash plate toward its full displacement position and a second supply delivers pressure fluid to the servo mechanism to tilt the swash plate toward its zero displacement position. The first supply includes a pressure control valve to control the pressure thereof. A pressure responsive valve is operable when the pressure of the fluid supplied to the motor exceeds a given value to deactivate the second supply, whereby the swash plate is tilted by the first supply toward its full displacement position. A destroke limiting valve is operably connected with the servo mechanism for controlling the second supply to maintain the swash plate in a destroke position adjacent the zero displacement position in order to protect the motor against reaching an undesirable overspeed condition.

25 Claims, 4 Drawing Figures

AUXILIARY HYDRAULIC DRIVE SYSTEM FOR ROAD GRADERS AND THE LIKE

BACKGROUND OF THE INVENTION

The present invention relates to a hydraulic auxiliary drive system for driving the normally non-driven wheels of a vehicle. Conventional heavy duty industrial machinery such as road graders and the like include a pair of driven rear wheels and a pair of steerable normally non-driven front wheels. Under certain conditions, it is desirable to provide a variable torque drive to the normally non-driven wheels to enhance the tractive effort of the vehicle. The present invention relates to an improved hydraulic auxiliary drive system for driving such wheels which is readily operable between forward and reverse conditions and which includes means for protecting the drive motors of the system from an undesirable overspeed condition such as when the vehicle front wheels are off the ground or are on an icy surface affording little or no traction.

BRIEF DESCRIPTION OF THE PRIOR ART

Auxiliary hydraulic drive systems are well known in the patented prior art as evidenced by the patent to Beck et al. U.S. Pat. No. 4,295,539 which is assigned to the predecessor of the assignee of the present invention. The Beck et al. patent discloses an auxiliary hydraulic drive system including variable displacement motors for driving the normally non-driven wheels of a vehicle. By changing the displacement of the motors, the torque of the auxiliary system is varied. More particularly, the displacement of the motors is varied from zero to full displacement by tilting the motor swash plate in accordance with fluid pressure supplied to a servo which tilts the swash plate. The fluid pressure supplied to the servo to tilt the swash plate is manually controlled by the operator of the vehicle.

While the variable torque auxiliary hydraulic drive system disclosed in the Beck et al. patent normally operates quite satisfactorily, it does possess certain inherent drawbacks. For example, in order to disengage or reverse the auxiliary drive, it is necessary to shift a control valve to arrest or reverse the flow of hydraulic pressure fluid in the system, thereby resulting in abrupt pressure spikes which may stress or damage the system. Moreover, with the auxiliary drive system of the Beck et al. patent engaged and with the motor swash plates at full displacement, should the steerable front wheels of the vehicle lose their tractive relationship with the ground such as when the wheels come off the ground or when the wheels are on an icy surface, the motors try to go to zero displacement producing an overspeed condition which will damage or destroy the motor.

The present invention was developed in order to overcome these and other drawbacks of the prior variable torque hydraulic auxiliary drive systems.

SUMMARY OF THE INVENTION

Accordingly, it is a primary object of the present invention to provide a hydraulic auxiliary drive system for driving the normally non-driven wheels of a vehicle including at least one variable displacement motor having a tiltable swash plate operable between a zero displacement position and a full displacement position. The motor drives at least one of the normally non-driven wheels. A variable displacement pump supplies the motor with a constant pressure fluid, the pump being driven by the drive engine of the vehicle. A spring normally biases the swash plate toward its zero displacement position and a servo mechanism is connected with the swash plate for tilting it between its zero and full displacement positions. Pressure fluid is supplied by a first supply to the servo mechanism to tilt the swash plate toward its full displacement position and a pressure control device connected with the first supply controls the pressure thereof. A second pressure supply delivers pressure fluid to the servo mechanism to tilt the swash plate toward its zero displacement position. A pressure responsive valve is operable when the pressure of the fluid supplied to the motor exceeds a given value to deactivate the second supply, whereby the swash plate is tilted by the first supply toward its full displacement position. A destroke limiting valve is operable by the servo mechanism to control the second supply to maintain the swash plate in a destroke position adjacent the zero displacement position to protect the motor from reaching an undesirable overspeed condition.

According to a more specific object of the invention, the destroke limiting valve is adjustable to vary the destroke limiting position.

According to a further object of the invention, the variable displacement pump is bi-directional to drive the motor in forward and reverse directions.

It is another object of the invention to provide a pressure compensation device for the pump to preset a compensating pressure level.

According to a further object of the invention, the pump pressure compensation device is operable to preset first and second compensating pressure levels.

BRIEF DESCRIPTION OF THE FIGURES

These and other objects of the invention will become apparent from a study of the following specification when viewed in the light of the accompanying drawing, in which.

DETAILED DESCRIPTION

Figure 1A:
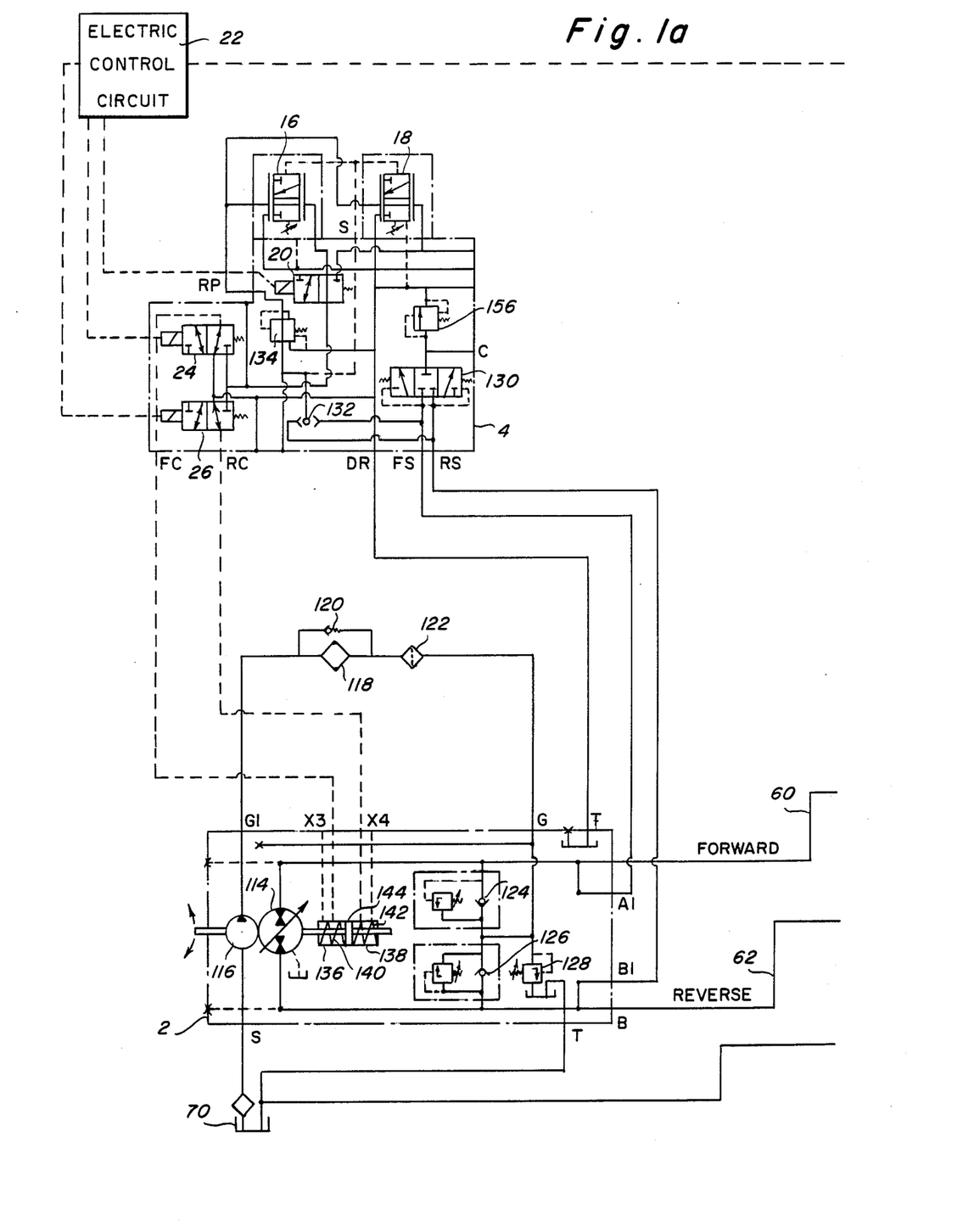
FIGS. 1a and 1b together comprise a hydraulic schematic diagram of the auxiliary system according to the invention.
Figure 1B:
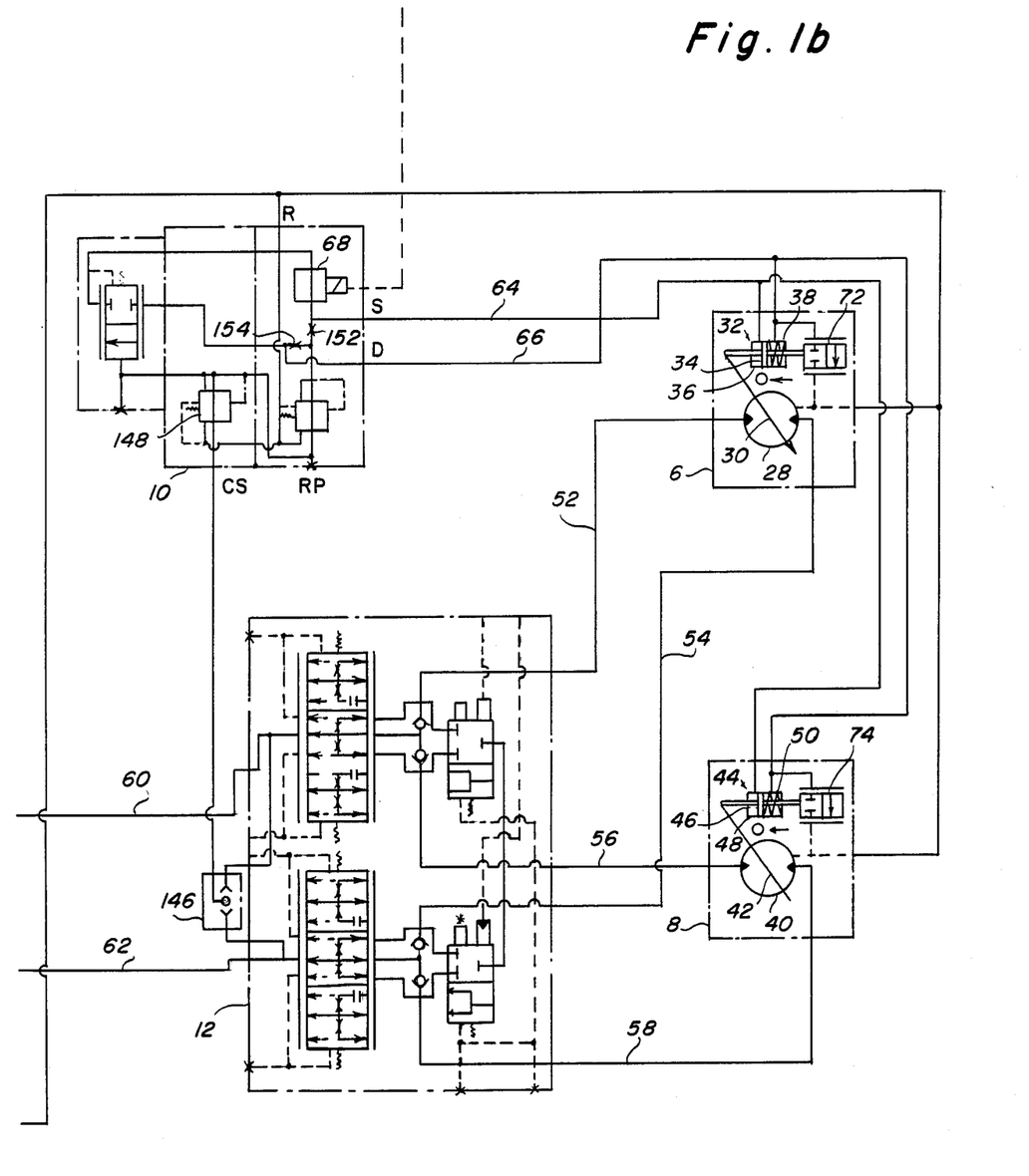

The auxiliary hydraulic drive system of the present invention is shown in the schematic diagram formed by joining FIGS. 1a and 1b. The basic components of the system include a pump assembly 2 controlled by a pump control mechanism 4, two motors 6, 8 controlled by a motor control mechanism 10, and a divider valve 12 for metering fluid flow from the pump to drive the motors. While the invention is shown including separate motors for independently driving each of the steerable normally non-driven wheels (not shown) of a vehicle, it will be apparent to those skilled in the art that a single motor may be used to drive both front steerable wheels via a differential if desired. Of course, with a single drive motor, the divider valve may be eliminated.

The pump assembly 2 includes a variable displacement main pump 14 which is driven off the main engine of the vehicle (not shown). In a preferred embodiment, the main pump 14 is bi-directional as will be developed in greater detail below.

The pump control valve 4 is connected with the pump assembly 2 to control the output thereof. Specifically, the pump control mechanism includes a low pressure compensator 16 and a high pressure compensator 18 which are operable to set a specific compensating level of the pump, whereby a constant pressure fluid is provided at the pump output. Selection of the appropriate pressure compensating level is made via a selector valve 20 operable by a solenoid. The solenoid is controlled by an electric control circuit 22 in a conventional manner.

The pump control valve also includes a forward selector valve 24 and a reverse selector valve 26 which are also operable by a solenoid under control of the electric control circuit. Operation of the forward and reverse selector valves activates the auxiliary hydraulic circuit to provide pressure fluid to the forward and reverse lines of the system as will be set forth in greater detail below.

The motor 6 may be used to drive the left front wheel of the vehicle and the motor 8 may be used to drive the right front wheel of the vehicle. The motor 6 comprises a variable displacement motor 28 having a tiltable swash plate 30 operable between zero and full displacement positions, respectively. A servo mechanism 32 including a piston 34 and cylinder 36 arrangement is connected with the swash plate to tilt it between its zero displacement position (i.e., to the left in FIG. 1b) and its full displacement position (i.e., to the right in FIG. 1b). A spring 38 normally biases the swash plate to its zero displacement position via the piston 34 of the servo mechanism 32.

The motor 8 is similar to the motor 6 and also includes a variable displacement motor 40 having a tiltable swash plate 42 operated by a servo mechanism 44 including a piston 46 and cylinder 48. A spring 50 normally biases the right motor swash plate toward its zero displacement position.

The variable displacement motors 28 and 40 are driven by pressure fluid from the divider valve 12 via lines 52,54 and 56,58, respectively. The divider valve 12 in turn is supplied with pressure fluid from the pump 2 via lines 60 and 62.

The displacement of the motors 28 and 40 is controlled by the motor control valve 10 which receives pressure fluid from the divider valve 12 and delivers fluid to the servo mechanisms 32 and 44 via first and second pressure fluid supplies. The first supply delivers stroking pressure fluid to the servo mechanisms via a line 64 to tilt the swash plates toward their full displacement positions. The second supply delivers destroking pressure fluid to the servo mechanisms via a line 66 to tilt the swash plates toward their zero displacement positions.

A variable orifice pressure control device 68 is connected with the first supply to control the pressure thereof. The variable orifice is opened and closed by a solenoid electrically controlled by the control circuit. With the orifice open, pressure fluid is vented to tank 70 causing a drop in pressure fluid in the first supply, whereby the swash plates destroke toward their zero displacement positions owing to the biasing force of the springs 38 and 50. Conversely, with the variable orifice 68 closed, the pressure in the line 64 increases, whereby the swash plates stroke toward their full displacement positions. Thus by controlling the variable orifice pressure control device 68 with constant system pressure, the torque of the motors may be varied.

A pressure responsive valve 71 of the motor control valve 10 is connected with the second supply and is operable when the pressure of the fluid supplied to the motor exceeds a given value to deactivate the second supply. Under this condition, the pressure in the line 66 drops and the swash plates are tilted by the pressure from the first supply toward their full displacement positions.

The motor 6 also includes a destroke limiting valve 72 connected with the piston 34 of the servo mechanism 32. The destroke limiting valve is operable by the servo mechanism to control the second supply to maintain the swash plate 30 in a destroke position adjacent the zero displacement position to protect the variable displacement motor 28 from reaching an undesirable overspeed condition as will be set forth in greater detail below. The motor 8 also includes a destroke limiting valve 74 which operates in the same manner as the limiting valve 72.

Figure 2:
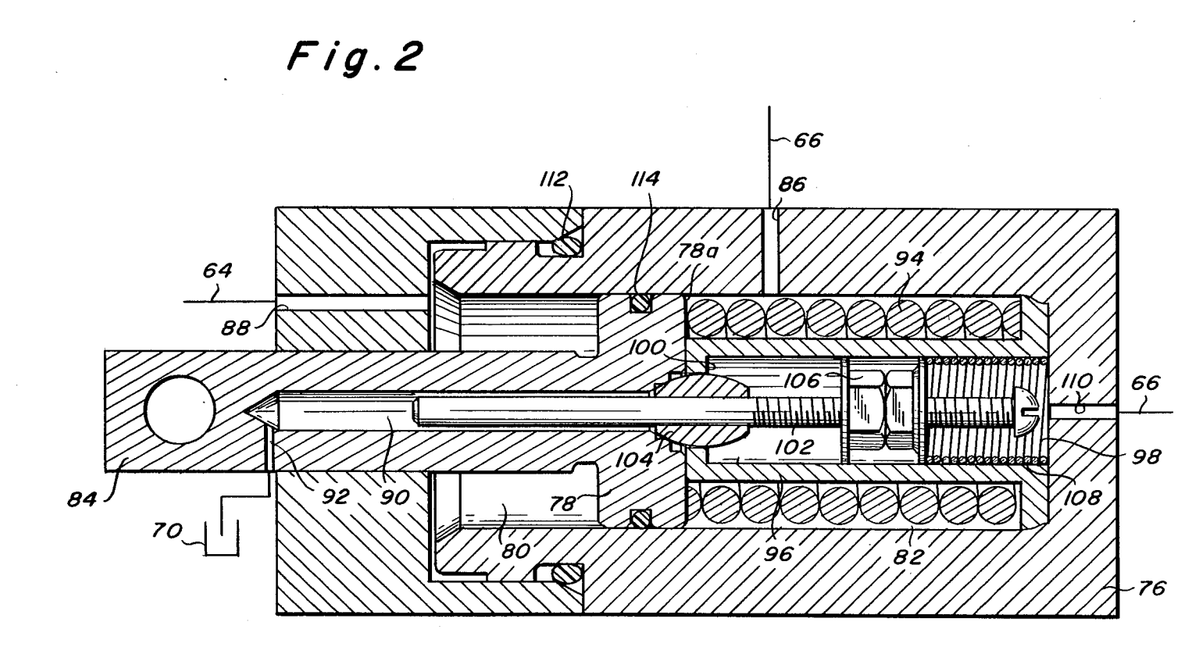
FIG. 2 is a detailed sectional view of the servo mechanism and destroke limiting valve of the invention in a first position.
Figure 3:
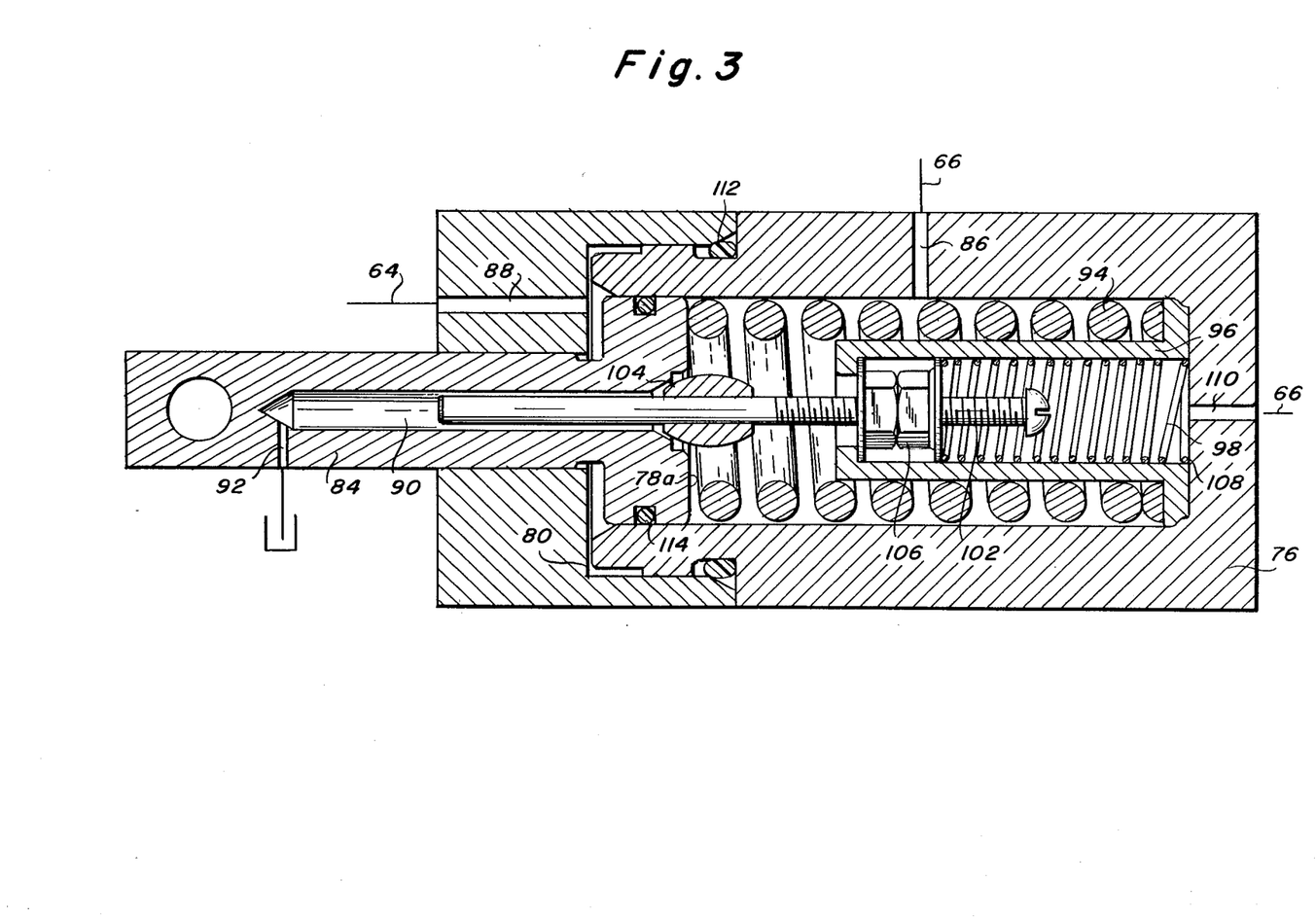
FIG. 3 is a detailed sectional view of the servo mechanism and destroke limiting valve of FIG. 2 in a position between intermediate and second positions.

A preferred combined servo mechanism and destroke limiting valve according to the invention is shown in the detailed sectional views of FIGS. 2 and 3. The servo includes a housing 76 containing a closed cylindrical chamber. A piston 78 is slidably movable within the chamber and defines a stroking compartment 80 and a destroking compartment 82 which are arranged at opposite ends of the chamber. The housing and piston correspond with the cylinder/piston arrangement of the servo mechanisms 32 and 44 of FIG. 1b. The piston also includes a piston rod 84 extending through the stroking compartment 80 and outwardly through a corresponding opening contained in the housing for connection with a motor swash plate. The housing contains a first inlet opening 86 in constant communication with the destroking compartment and connected with the line 66 of the second supply. The housing also contains a second inlet opening 88 in constant communication with the stroking chamber and connected with the line 64 from the first supply.

The piston contains an axial bore 90 extending from the end surface 78a of the piston adjacent the destroking compartment 82 axially through the piston and longitudinally within the piston rod 84. The axial bore terminates at a position external of the housing 76 and the piston rod contains an outlet opening 92 arranged externally of the housing in communication with the axial bore. The outlet opening is connected with the reservoir tank 70. Thus the axial bore defines a flow path from the first inlet opening 86 to the outlet opening 92 and tank 70 via the destroking compartment 82 and the bore 90.

A first spring 94 (which corresponds with the springs 38 and 50 of FIG. 1b) is arranged in the destroking compartment 82 and normally biases the piston from a first position shown in FIG. 2 toward a second position (not shown) producing a maximum volume of the destroking compartment. More particularly, the spring biases the piston (toward the left in the FIGS. 2 and 3) to destroke the motors by tilting the swash plates thereof toward their zero displacement positions.

The destroking chamber 82 also contains a hollow cylindrical member 96 concentrically arranged within the housing 76 and having the first spring 94 concentrically arranged thereabout. The cylindrical member extends between the end wall of the housing and the surface 78a of the piston 78 when the piston is in its first position as shown in FIG. 2 and defines a cylindrical through-bore 98. The cylindrical housing includes a cylindrical stop 100 adjacent the piston end thereof, the stop extending radially inwardly into the through-bore. A poppet valve assembly is arranged within the through-bore 98 and is operable to normally close the flow path between the destroking compartment 82 and the outlet opening 92 when the piston is between its first position and an intermediate position between its first and second positions as will be set forth in greater detail below.

The poppet valve assembly includes a longitudinal member such as a threaded screw 102 slidably movable within the through-bore 98 and arranged coaxially with and extending in concentrically spaced relation within the axial bore 90 of the piston and piston rod. A poppet valve 104 is secured to the screw 102. As shown in FIG. 2, the poppet valve 104 is arranged in the destroking chamber 82 and is configured to mate with the orifice of the axial bore 90 adjacent the end surface 78a of the piston to close the axial bore when the piston is between its first position and the intermediate position.

A pair of flanged nuts 106 are threadably adjustably connected with the screw, and a second spring 108 is arranged in the through-bore between the housing end wall and the threaded nuts 106 to bias the nuts, the screw and the poppet valve toward the piston to close the orifice of the axial bore. The housing end wall contains a third inlet opening 110 affording constant communication with the through-bore 98. The third inlet opening is connected with the line 66 of the second supply.

As pressure fluid from the second supply through the line 66 increases, the piston 78 will be displaced from its first position shown in FIG. 2 toward the second position corresponding with the zero displacement position of the swash plate. As the piston moves within the chamber, so too does the poppet valve assembly move with the piston owing to the biasing force of the spring 108 and the fluid pressure from the third inlet opening 110.

Eventually, the flanged nuts 106 of the piston valve assembly will strike the stop 100 of the cylindrical member 96 arresting movement of the poppet valve assembly at a destroke limiting position. Further movement of the piston results in the opening of the flow path between the destroking compartment 82 and the outlet opening 92, thereby to bleed pressure fluid to tank and arresting movement of the piston at the intermediate position shown in FIG. 3 between the first and second position. By adjusting the longitudinal position of the threaded nuts 106 relative to the screw 102, the destroke limiting position may be varied, thereby varying the intermediate position of the piston to prevent the piston from reaching its second position.

As has been shown, in the presence of stroke biasing pressure in first supply line 64, the swash plate of the motors is prevented from reaching its zero displacement position such as when the vehicle wheels come off the ground or lose their tractive effects relative to the ground surface. By preventing zero displacement of the motors with motors running at full speed, a dangerous overspeed condition of the motors is avoided.

In accordance with the preferred construction of the servo mechanism shown in FIGS. 2 and 3, O-rings 112 and 114 are provided in the housing 76 and piston 78 to prevent leaks of pressure fluid.

OPERATION OF HYDRAULIC AUXILIARY DRIVE SYSTEM

There are four primary operating conditions of the auxiliary hydraulic drive system of the present invention:

A. Hydraulic system off and motors at zero displacement;
B. Pump modulating displacement and motors at full displacement;
C. Pump at full displacement and motors modulating displacement automatically; and
D. Pump at full displacement and motors at limited destroke.

A. Hydraulic System Off and Motors at Zero Displacement

With the hydraulic system off and the motors at zero displacement, no tractive effort is delivered to the normally non-driven wheels of the vehicle. The charge circuit pump 116 draws hydraulic fluid such as oil from the reservoir tank 70 and pumps it through a cooler 118 if the pressure drop through the cooler is low enough to keep the cooler bypass valve 120 from opening. The oil passes through a filter 122 and once back in pump 2 can pass through charge pressure check valves 124 and 126 to pressurize ports A, A1, B, and B1 on pump 2 to, for example, 240 psi, the setting of system-off charge pressure relief valve 128. Excess oil not required to pressurize ports A, A1, B, and B1 goes through system-off charge pressure relief valve 128 and back to reservoir tank 70. This also pressurizes ports FS and RS on pump control valve 4. Since the two pressures are equal, hot oil shuttle valve 130 remains neutral (as shown).

In the pump control valve 4, the oil passes through the high pressure shuttle valve 132, through a pressure reducing valve 134 (since the valve is in the position shown because the downstream pressure is lower than the valve setting of, for example, 350 psi), through both low pressure compensator 16 and high pressure compensator 18 (since the valve is in the position shown because the sensing pressure acting on the end of the spool is lower than the spring settings of the valves), and to boost selector valve 20 which is not energized and therefore is shown blocking oil flow from high pressure compensator 18 but allowing flow from low pressure compensator 16 to proceed to both forward and reverse selector valves 24 and 26. Since selector valves 24 and 26 are as shown (not energized), the charge oil is blocked and stroke chambers 136 and 138 are ported to tank, thereby allowing piston springs 140 and 142 to center the stroke piston 144 and cause the pump 14 to remain at zero displacement.

Forward 60 and reverse 62 lines to and from the divider valve 12 and motors 6 and 8 will all remain at charge pressure setting of, for example, 240 psi. Shuttle valve 146 will allow charge flow to proceed to motor control valve 10. Since the system pressure of, for example, 240 psi coming into motor control valve 10 is lower than the pressures of pressure reducing valves 148 (having a pressure setting of 3000 psi, for example, to protect the pressure responsive valve 71) and 150 (having a pressure setting of 350 psi, for example), both valves remain open and allow the oil to proceed to fixed orifices 152 and 154. Since there is no power coming from the electric control circuit 22, there will be no power at variable orifice 68 to restrict the flow going to reservoir 70 from fixed orifice 152. Therefore, stroke pressure at port S of valve 10, in line 64, and in the stroke chambers of the motors is near zero allowing the destroking springs 38 and 50 to destroke the motors to zero displacement. Because stroke pistons 34 and 46 have moved to a zero displacement condition, destroke limiter valves 72 and 74 are wide open allowing any flow coming from fixed orifice 154 to be drained to the case of the motors and back to reservoir tank 70.

In summary, with the system off and the motors 28 and 40 turning, only leakage fluid flows in the main system lines which allows the use of smaller lines and reduces stress to the system.

B. Modulating Pump Displacement and Motors at Full Displacement

To turn the system on, either the forward selector valve 24 or the reverse selector valve 26 must be shifted by the electric control circuit 22. By way of example, the operation of the system will be discussed in the forward condition with the forward selector valve energized to allow the 240 psi oil to go to the pump stroking chamber 136. Since 240 psi is greater than the initial force from the forward piston spring 142, the main pump 14 begins to increase displacement and pressurizes the forward line 60 at ports A and A1 of pump 2.

This brings oil flow and pressure to forward port FS at pump control valve 4 and shifts the hot oil shuttle 130 to the right porting reverse oil at port RS to the system-on charge pressure relief 156 set at, for example, 200 psi. Since used hot oil is flowing into main pump 2 through port B and filtered, cool oil is coming through check valve 126 (system off relief valve 128 closed) and a portion of the used hot oil will go out port B1 of pump 2 to port RS of valve 4, through the hot oil shuttle 130, through relief valve 156, and back to reservoir tank 70.

Pump Control

Oil going into valve 4 at port FS passes beyond high pressure shuttle valve 132, and is reduced to, for example, 350 psi at pressure reducing valve 134 and supplied to both pump compensators 16 and 18. Compensator valve 16 will remain in the position shown until the sensing pressure (system pressure from shuttle valve 132) approaches, for example, 3200 psi (the spring setting of the compensator). Therefore, if the system pressure is below 3200 psi, compensator 16 will allow some of the 350 psi oil to go to the pump and force the pump to stroke more; in turn if the system pressure is above 3200 psi, compensator 16 will allow some of the stroking pressure at port FC to be drained back to the reservoir tank and thus destroke the pump. This action forces pump 14 to put out whatever flow is required to maintain the system pressure at 3200 psi. The selector valves 24 and 26 provide pressure compensation in either direction and the boost selector 20 energized by the electric control citcuit 22 allows control of the pump using low pressure compensator 16 or high pressure compensator 18.

Motor Control

Forward pressure is ported to motor control valve 10 through shuttle valve 146. This pressure is reduced to 3000 psi through the pressure reducing valve 148. This 3000 psi is high enough to overcome the spring in pressure responsive valve 71, thus shifting valve 71 up and allowing the pressure at port D of valve 10 and the flow from fixed orifice 154 to drain to reservoir tank 70. The 3000 psi coming from pressure reducing valve 148 is further reduced at pressure reducing valve 150 to 350 psi. With the electric control circuit 22 providing maximum voltage to the variable orifice 68, the variable orifice restricts the oil flow coming out of fixed orifice 152 thus causing port S on valve 10, line 64, and the stroking chambers to see maximum stroke pressure. This maximum stroke pressure forces the motor swash plate to full displacement and in turn maximum tractive effort. A decrease in voltage from the electric control circuit 22 will result in a decrease in stroke pressure in line 64 which results in a decrease in motor displacement. The motor speed and pump output flow is determined by how fast the front wheels are being allowed to turn by the ground. The speed of the ground is actually determined by the rear drive of the vehicle.

In summary, the motors are stroked to the displacement determined by the opening in the variable orifice 68 set by the electric control circuit 22. The ground and rear drive of the vehicle allows the front wheels to turn at a certain speed and the pump and pressure compensators adjust the flow in the system to maintain 3200 psi or 4700 psi in accordance with which pressure compensator is selected by the selector valve 20 also controlled by the electric control circuit.

C. Pump at Full Displacement and Modulating Motor Displacement

As ground speed increases from the above condition, eventually the pump will reach its maximum displacement and the system pressure will begin to fall below 3200 psi. The pump compensator 16 will remain as shown allowing the full 350 psi to the pump stroke chamber 136 to hold the pump at full stroke. If the wheels are allowed to turn faster yet, the system pressure will eventually drop below 2800 psi. The pressure response valve 71 with a setting of 2800 psi senses this and returns to the position shown blocking flow from fixed orifice 154 to the reservoir tank 70. This increases the destroke pressure at the motor from the line 66 causing the stroke piston 34 to move the swash plate to a lesser displacement. This lesser displacement with the same incoming flow causes the system pressure to go back up. The pressure response valve 71 begins modulating to continually adjust the motor displacement to maintain 2800 psi system pressure. Accordingly, with the pump at full displacement and flow out at a maximum level, the pressure response valve 71 constantly adjusts motor displacement via the servo mechanism to maintain system pressure at 2800 psi.

D. Pump at Full Displacement and Motors at Limited Destroke Displacement

Some conditions exist where the ground poses little or no tractive resistance to the wheels and hydraulic system such as on ice or when the wheels are not even touching the ground. In this condition the system pressure will drop below 2800 psi and the only way for the pressure to get back up to 2800 psi is for the motor to decrease to a very small displacement which will produce enough torque to overcome friction in gears and motors. Such a low displacement causes the motors to turn at high enough rpm's to damage rotating parts in the motors.

Low system pressures make the pump compensator 16 force the pump 14 to maintain full stroke. Low system pressures also cause pressure response valve 71 to close and builds pressure in the destroke chamber of the motor 6. As the destroke pressure combined with the force from the compressed piston spring 38 overcomes the pressure in the stroking chamber, the stroke piston 34 moves the motor to a lesser displacement. At the same time the destroke limiter valve 72 is moved nearer to an open position since it is directly attached to the stroke piston 34. The piston will eventually move the destroke limiter valve 72 to an open position allowing destroke oil to bleed to reservoir tank 70. The limiter valve then will modulate at this position to hold the pressure at a level which will hold the piston and in turn the valve 72 steady and the motor at a predetermined limited displacement. Thus, if the wheels begin spinning and system pressures are below compensator settings, the pump will go to full stroke and the motors will try to go to zero displacement by the pressure response valve 71. However, the limited displacement valve 72 prevents the motor from going all the way to zero displacement.

With the hydraulic auxiliary drive system of the present invention, better control of the front wheels of road graders and the like is available when the grader experiences sideloads due to ditchbanks, moldboard sidedraft, cornering, or gravity. Furthermore, the system uses horsepower which cannot be transferred to the ground through standard rear drives. The bi-directional pump of the system provides smoother operation with significantly lower pressure spikes when shifting from forward or reverse to neutral. The two compensating valves on the pump enable an operator, to select, via the electrical control circuit, one of two levels of operating pressure and thus two levels of maximum tractive effort. Finally, the destroke limiter valve allows the variable displacement motors to destroke only to a preset minimum displacement when the system is on and to zero displacement when the system is off.

The electrical control circuit is a conventional circuit which controls the switching oerations to automatically engage and/or disengage through the operation of the clutch brakes and transmission of the vehicle.

While in accordance with the provisions of the Patents Statute the preferred forms and embodiments of the invention have been illustrated and described, it will be apparent to those skilled in the art that various changes and modifications may be made without deviating from the inventive concepts set forth above.

What is claimed is:

1. A hydraulic auxiliary drive system for driving the normally non-driven wheels of a vehicle, comprising
    (a) at least one variable displacement motor having a tiltable swash plate operable between zero and full displacement positions, respectively, said motor driving at least one of said non-driven wheels;
    (b) variable displacement pump means for supplying said motor with a constant pressure fluid;
    (c) spring means normally biasing said swash plate toward its zero displacement position;
    (d) servo means connected with said swash plate for tilting the same between its zero and full displacement positions, respectively;
    (e) first supply means for supplying pressure fluid to said servo means to tilt said swash plate toward its full displacement position;
    (f) pressure control means connected with said first supply means for controlling the pressure thereof;
    (g) second supply means for supplying pressure fluid to said servo means to tilt said swash plate toward its zero displacement position;
    (h) pressure responsive valve means operable when the pressure of the fluid supplied to said motor exceeds a given value to deactivate said second means, whereby said swash plate is tilted by said first supply means toward its full displacement position; and
    (i) destroke limiting valve means operable by said servo means for controlling said second supply means to maintain said swash plate in a destroke position adjacent said zero displacement position, thereby to protect said motor against reaching an undesirable overspeed condition.

2. Apparatus as defined in claim 1, wherein said servo means comprises
    (1) a housing containing a closed cylindrical chamber; and
    (2) piston means slidably movable within said chamber, said piston means including a piston defining stroking and destroking compartments at opposite ends of said chamber, respectively, said piston means further including a piston rod extending through said stroking compartment and outwardly through a corresponding opening contained in said housing and connected with said swash plate, said housing containing a first inlet opening affording continuous communication between said destroking chamber and said first supply means and a second inlet opening affording continuous communication between said stroking chamber and said second supply means.

3. Apparatus as defined in claim 2, wherein said spring means is arranged within said housing destroking compartment biasing said piston means from a first position in said housing chamber toward a second position corresponding with the zero displacement position of said swash plate producing maximum volume of said destroking compartment.

4. Apparatus as defined in claim 3, wherein said piston means contains an axial bore extending from the end surface of said piston adjacent said destroking compartment axially through said piston and longitudinally within said piston rod, said axial bore terminating at a position external of said housing, said piston rod containing an outlet opening arranged externally of said housing in communication with said axial bore, thereby to define a flow path from said first inlet opening to said outlet opening via said destroking compartment and said axial bore, and further wherein said destroke limiting valve means includes
    (1) poppet valve means for normally closing said flow path when said piston means is between said first position and an intermediate position between said first and second positions, including
        (i) a poppet valve mounted in said destroking chamber; and
        (ii) poppet valve spring means biasing said poppet valve toward said piston means to close the orifice of said axial bore; and
    (2) means for opening said poppet valve means when said piston means is between said intermediate and second positions.

5. Apparatus as defined in claim 4, wherein said poppet valve opening means comprises
    (i) a hollow cylindrical member concentrically arranged within said housing destroking chamber, said cylindrical member extending between opposite ends of said destroking chamber when said piston means is in its first position, said cylindrical member defining a cylindrical through-bore and including stop means extending into said bore, said housing containing a second inlet opening affording constant communication between said through-bore and said second supply means;

(ii) a longitudinal member slidably movable within said through-bore and arranged coaxially with and extending in concentrically spaced relation within said axial bore, said poppet valve being connected with said longitudinal member; and (iii) a flanged member arranged within said through-bore and connected with said longitudinal member, said flanged member striking said stop member when said piston means reaches its intermediate position, whereby upon further movement of said piston means toward said second position, said poppet valve means opens.

6. Apparatus as defined in claim 5, wherein said poppet valve spring means is arranged within said through-bore between said flanged member and said housing.

7. Apparatus as defined in claim 6, wherein said longitudinal member is threaded, and further wherein said flanged member is longitudinally adjustable relative to said threaded member.

8. Apparatus as defined in claim 1, wherein said pump means includes pressure compensation means for presetting a compensating pressure level.

9. Apparatus as defined in claim 8, wherein said pressure compensation means is operable to preset first and second compensating pressure levels.

10. Apparatus as defined in claim 9, wherein said pump means comprises a bi-directional pump.

11. Apparatus as defined in claim 10, wherein said pressure control means comprises a variable orifice electrically controlled by a solenoid for connecting said first supply means to drain.

12. Apparatus as defined in claim 11, wherein said first supply means includes a fixed orifice upstream of said variable orifice.

13. Apparatus as defined in claim 12, wherein said second supply means includes a fixed orifice upstream of said pressure responsive valve means.

14. Apparatus as defined in claim 13, and further comprising pressure reducing valve means arranged between said pump means and said servo means.

15. A hydraulic auxiliary drive system for driving the normally non-driven wheels of a vehicle, comprising
(a) at least one variable displacement motor having a tiltable swash plate operable between zero and full displacement positions, respectively, said motor driving at least one of said non-driven wheels;
(b) variable displacement pump means for supplying said motor with a constant pressure fluid;
(c) spring means normally biasing said swash plate toward its zero displacement position;
(d) servo means connected with said swash plate for tilting the same between its zero and full displacement positions, respectively;
(e) first supply means for supplying pressure fluid to said servo means to tilt said swash plate toward its full displacement position;
(f) pressure control means connected with said first supply means for controlling the pressure thereof;
(g) second supply means for supplying pressure fluid to said servo means to tilt said swash plate toward its zero displacement position; and (h) pressure responsive valve means operable when the pressure of the fluid supplied to said motor exceeds a given value to deactivate said second means, whereby said swash plate is tilted by said first supply means toward its full displacement position.

16. Apparatus as defined in claim 15, wherein said bidirectional pump means includes pressure compensation means for presetting a compensating pressure level.

17. Apparatus as defined in claim 16, wherein said pressure compensation means is operable to preset first and second compensating pressure levels.

18. Apparatus as defined in claim 17, wherein said pressure control means comprises a variable orifice electrically controlled by a solenoid for connecting said first supply means to drain.

19. Apparatus as defined in claim 18, wherein said first supply means includes a fixed orifice upstream of said variable orifice.

20. Apparatus as defined in claim 19, wherein said second supply means includes a fixed orifice upstream of said pressure responsive valve means.

21. Apparatus as defined in claim 20, and further comprising pressure reducing valve means arranged between said pump means and said servo means.

22. Destroke limiter valve means, comprising
(a) a housing containing a closed cylindrical chamber;
(b) piston means slidably movable within said chamber, said piston means including a piston defining stroking and destroking compartments at opposite ends of said chamber, respectively, said piston means further including a piston rod extending through said stroking compartment and outwardly through a corresponding opening contained in said housing, said housing containing first and second inlet openings in constant communication with said destroking and stroking compartments, respectively, said piston means containing an axial bore extending from the end surface of said piston adjacent said destroking compartment axially through said piston and longitudinally within said piston rod, said axial bore terminating at a position external of said housing, said piston rod containing an outlet opening arranged externally of said housing in communication with said axial bore, thereby to define a flow path from said first inlet opening to said outlet opening via said destroking compartment and said axial bore;
(c) first spring means biasing said piston means from a first position in said housing chamber toward a second position producing maximum volume of said destroking compartment;
(d) poppet valve means for normally closing said flow path when said piston means is between said first position and an intermediate position between said first and second positions, including
(1) a poppet valve mounted in said destroking chamber; and
(2) second spring means biasing said poppet valve toward said piston means to close the orifice of said axial bore; and
(e) means for opening said poppet valve means when said piston means is between said intermediate and second positions.

23. Apparatus as defined in claim 22, wherein said poppet valve opening means comprises
(i) a hollow cylindrical member concentrically arranged within said housing destroking chamber, said cylindrical member extending between opposite ends of said destroking chamber when said piston means is in its first position, said cylindrical member defining a cylindrical through-bore and including stop means extending into said bore, said housing containing a third inlet opening affording constant communication with said through-bore;

(ii) a longitudinal member slidably movable with said through-bore and arranged coaxially with and extending in concentrically spaced relation within said axial bore, said poppet valve being connected with said longitudinal member; and (iii) a flanged member arranged within said through-bore and connected with said longitudinal member, said flanged member striking said stop member when said piston means reaches its intermediate position, whereby upon further movement of said piston means toward said second position, said poppet valve means opens.

24. Apparatus as defined in claim 23, wherein said second spring means is arranged within said through-bore between said flanged member and said housing.

25. Apparatus as defined in claim 24, wherein said longitudinal member is threaded, and further wherein said flanged member is longitudinally adjustable relative to said threaded member.

* * * * *